US012086272B2

(12) United States Patent
Rosenoer

(10) Patent No.: US 12,086,272 B2
(45) Date of Patent: *Sep. 10, 2024

(54) SYSTEMS AND METHODS FOR CONDUCTING BLOCKCHAIN ACTIONS BASED ON NETWORK MAPPINGS OF SELF-EXECUTING PROGRAM CHARACTERISTICS

(71) Applicant: Citibank, N.A., New York, NY (US)

(72) Inventor: Jonathan Miles Collin Rosenoer, Westport, CT (US)

(73) Assignee: Citibank, N.A., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/358,917

(22) Filed: Jul. 25, 2023

(65) Prior Publication Data
US 2024/0232381 A1 Jul. 11, 2024

Related U.S. Application Data

(63) Continuation of application No. 18/152,694, filed on Jan. 10, 2023, now Pat. No. 11,755,746.

(51) Int. Cl.
*H04L 9/00* (2022.01)
*G06F 16/23* (2019.01)
*G06F 21/57* (2013.01)

(52) U.S. Cl.
CPC ........ *G06F 21/577* (2013.01); *G06F 16/2358* (2019.01); *H04L 9/50* (2022.05); *G06F 2221/034* (2013.01)

(58) Field of Classification Search
None
See application file for complete search history.

(56) References Cited

U.S. PATENT DOCUMENTS 11,423,409 B2 * 8/2022 Arai ..................... G06Q 20/389
2009/0116651 A1 5/2009 Liang et al.
(Continued)

OTHER PUBLICATIONS

Notice of Allowance issued in U.S. Appl. No. 18/361,507 on Oct. 27, 2023.
(Continued)

*Primary Examiner* — Fatoumata Traore
(74) *Attorney, Agent, or Firm* — Foley & Lardner LLP

(57) ABSTRACT

Systems and methods for generating network mappings of self-executing program characteristics. For example, the system may receive a first user request to generate a mapping of a first network, wherein the mapping indicates self-executing program characteristics corresponding to each self-executing program of a first plurality of self-executing programs. In response to the first user request, the system may query the first plurality of self-executing programs to generate the mapping by identifying each self-executing program in the first plurality of self-executing programs, determining respective relationships between each self-executing program in the first plurality of self-executing programs and other self-executing programs in the first plurality of self-executing programs, and determining respective self-executing program characteristics for each self-executing program in the first plurality of self-executing programs. The system may store the mapping.

19 Claims, 5 Drawing Sheets

(56) References Cited

U.S. PATENT DOCUMENTS

2017/0140408 A1\* 5/2017 Wuehler ............ G06Q 30/0207
2020/0034469 A1\* 1/2020 Sato ................... G06F 16/1834
2020/0242595 A1\* 7/2020 Harrison ............ H04L 67/1097
2021/0357195 A1\* 11/2021 Zhu ....................... H04L 9/3236

OTHER PUBLICATIONS

Notice of Allowance issued in U.S. Appl. No. 18/535,873 on Mar. 22, 2024.

\* cited by examiner

SYSTEMS AND METHODS FOR CONDUCTING BLOCKCHAIN ACTIONS BASED ON NETWORK MAPPINGS OF SELF-EXECUTING PROGRAM CHARACTERISTICS

CROSS-REFERENCE TO RELATED APPLICATION(S)

This application is a continuation of U.S. patent application Ser. No. 18/152,694, filed Jan. 10, 2023. The content of the foregoing application is incorporated herein in its entirety by reference.

BACKGROUND

A blockchain is a decentralized ledger of transactions built upon a combination of cryptography techniques (e.g., secret keys, hash functions, etc.), consensus mechanisms (e.g., proof-of-work, proof-of-stake, etc.), and computer networks (e.g., peer-to-peer (P2P) networks, the Internet, etc.). The blockchain stores information electronically, grouped together into a series of subsets of the information, called "blocks." The information may be maintained by a network of computers using cryptography and consensus mechanisms, which make the records difficult to hack or alter. Specifically, the integrity of the information in each block may be maintained through one-way cryptographic functions that make the information immutable for practical purposes.

As blocks of information are added, the various blocks form a chain, which represents an immutable record of all the previous transactions across the network. Given the immutability of the records, the public availability of the information in the blockchain, and the reliance on consensus mechanisms for adding new blocks, the blockchain does not require a central authority to monitor transactions, maintain records, and/or enforce rules. As such, blockchains and blockchain technology has become a foundation of many decentralized applications.

Blockchain technology has also led to the development and rise in popularity of self-executing programs (e.g., smart contracts). Self-executing programs comprise a program in which rules for execution are written into lines of code. The code and the rules contained therein may then exist across a distributed, decentralized blockchain network. For example, a self-executing program may comprise a contract in which the terms of the agreement between buyer and seller are written into lines of code. Furthermore, the program may be executed automatically in response to detecting that certain conditions are met. These conditions may be based on the blockchain network, another self-executing program, and/or an application that connects the blockchain network to one or more external systems (e.g., an oracle).

SUMMARY

Despite the technological breakthrough that blockchain and blockchain technology represent, practical implementations of blockchain technology have been hindered by several technical problems. For example, the predetermined conditions and resulting actions from the execution of the self-executing programs are, in fact, encoded into them and cannot be changed after they are published to a blockchain. This raises serious security concerns because they can then be analyzed for flaws to be used for malicious attacks. These security concerns, in turn, present challenges to integrating blockchain technology into traditional, centralized software infrastructures.

Furthermore, public, non-permissioned networks may allow any user to publish a self-executing program. This means that unknown third parties can install self-executing programs that execute on all network nodes without explicit permission of any first party node owner. These self-executing programs permanently reside on the blockchain and cannot be changed or deleted. Even if the third party is known, it is not generally known by the first party node owner who, in fact, coded the self-executing program and whether the code is fit for its purpose. This is a particular concern because due to the relative newness of blockchains and associated tools, self-executing programs can be hard to code and debug prior to installation.

As such, users attempting to use self-executing programs or rely on the execution of self-executing programs face significant uncertainty regarding the state of the self-executing programs and/or any characteristics of those self-executing programs. To overcome these technical deficiencies in existing systems, systems and methods are disclosed herein for mapping networks in order to facilitate the blockchain actions across the network, but also to facilitate the use of self-executing programs and the integration of self-executing programs with traditional infrastructure.

Mapping a network according to application security and regulatory compliance characteristics means organizing and configuring the network in a way that meets both security and compliance requirements for the specific applications it will be used for. This typically involves identifying the security risks and vulnerabilities associated with each application, as well as the regulatory requirements that apply to the data and systems the network will be handling. The network can then be designed and configured to address both sets of requirements, ensuring that it is able to provide robust security and comply with relevant regulations. This may involve implementing security controls such as access controls and encryption, as well as adhering to specific industry or government standards for data handling and security. The goal is to ensure that the network is able to support the applications it will be used for in a secure and compliant manner.

To map the applications on a computer network, a system may first need to identify all self-executing programs (e.g., smart contracts), associated self-executing programs, and other applications (e.g., oracles, network bridges, linked databases, decentralized systems) running on or on top of the network, along with their specific requirements and characteristics. This could involve conducting a network assessment or inventory to identify all the devices and systems connected to the network, as well as the applications and services running on those devices.

Once a complete inventory is obtained, the system may then evaluate each one in terms of particular requirements (e.g., compliance, security, etc.). As such, the system may determine specific configuration and attributes of each application, device, and program, and identify any potential conflicts with predetermined criteria (e.g., compliance, security, etc.) or compatibility issues.

Having mapped the network design and configuration, the system may constrain the ability of network users only to use self-executing programs and other applications that are compliant with the predetermined criteria. By doing so, the system optimizes usage of the network given particular user needs, such as protection of sensitive data (e.g., using zero knowledge proofs, homomorphic encryption, etc.). Additionally or alternatively, the system may ensure that the mapping and requirements enforcement is reliable and efficient, and may identify any potential issues or problems. That is, the system may provide recommendation for both conduction actions on a network, but also recommendations on the most efficient and/or beneficial manner in which to conduct those actions.

In some aspects, systems and methods are disclosed herein for generating network mappings of self-executing program characteristics. For example, the system may receive a first user request to generate a mapping of a first network, wherein the mapping indicates self-executing program characteristics corresponding to each self-executing program of first plurality of self-executing programs. In response to the first user request, the system may query the first plurality of self-executing programs to generate the mapping by identifying each self-executing program in the first plurality of self-executing programs, determining respective relationships between each self-executing program in the first plurality of self-executing programs and other self-executing programs in the first plurality of self-executing programs, and determining respective self-executing program characteristics for each self-executing program in the first plurality of self-executing programs. The system may store the mapping.

In some aspects, systems and methods are disclosed herein for conducting blockchain actions based on the network mappings. For example, the system may receive a mapping of a first network, wherein the mapping indicates self-executing program characteristics corresponding to each self-executing program of first plurality of self-executing programs. The system may receive a first user request to perform a first blockchain action using the first network. The system may determine a first self-executing program requirement for the first user request. The system may determine, based on the mapping, a second plurality of self-executing programs corresponding to the first self-executing program requirement. The system may determine a third plurality of self-executing programs corresponding to the first blockchain action. The system may filter the third plurality of self-executing programs based on the second plurality of self-executing programs to generate a first subset of self-executing programs for performing the first blockchain action. The system may generate a first recommendation, on a first user device, for performing the first blockchain action using the first subset.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
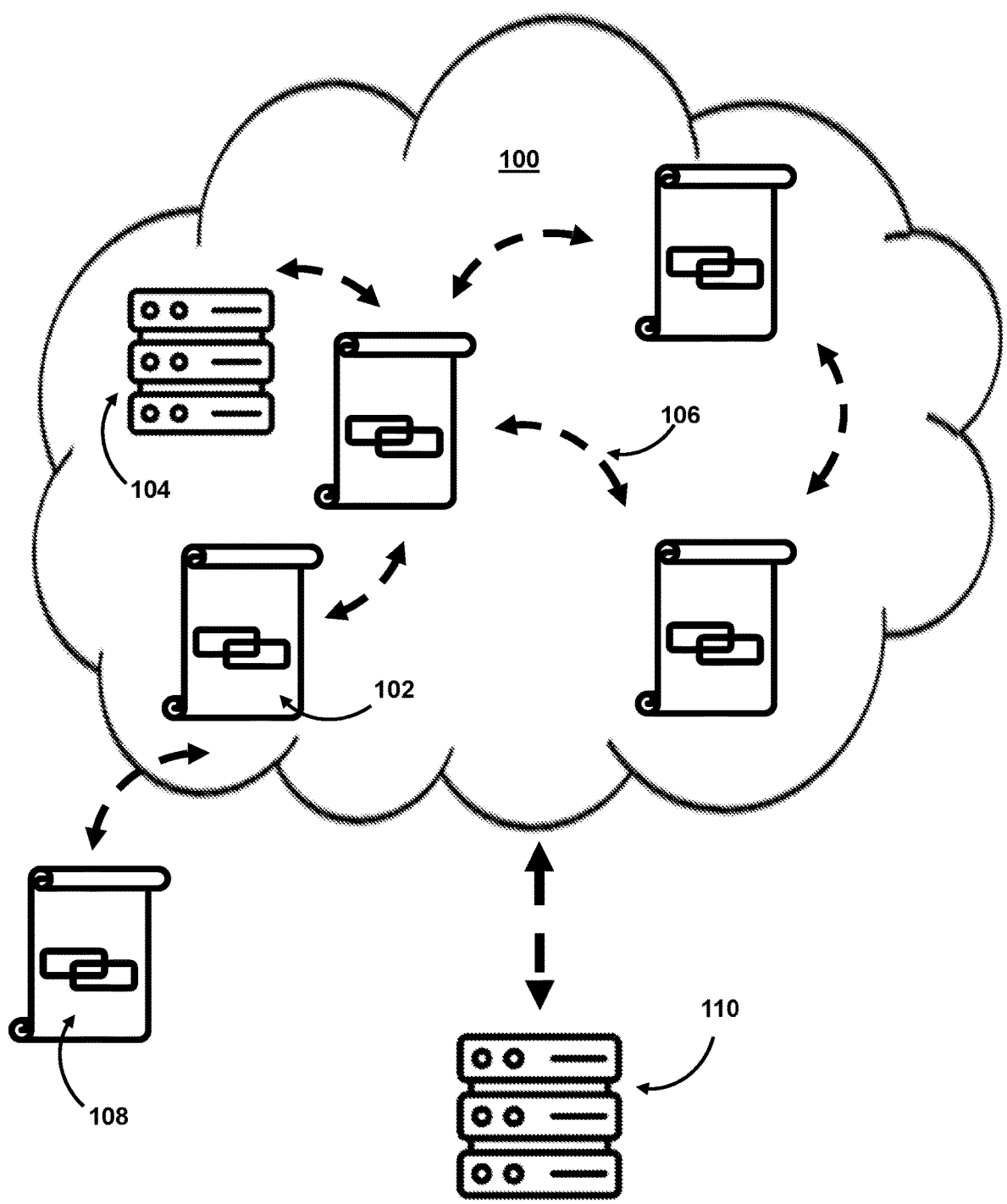
FIG. 1 shows an illustrative diagram for generating network mappings of self-executing program characteristics, in accordance with one or more embodiments.

FIG. 1 shows an illustrative diagram for generating network mappings of self-executing program characteristics, in accordance with one or more embodiments. For example, the system may include network 100, which may be a blockchain network. The system may iterate through and/or index all self-executing programs (e.g., smart contracts), associated self-executing programs, and/or other applications (e.g., oracles, network bridges, linked databases, DeFi systems) running on or on top of a blockchain network. For example, system 110 may iterate through self-executing program 102 and oracle 104. Additionally, FIG. 1 may include a self-executing program that is external to the network (e.g., self-executing program 108) as well as the relationships between various on-network and off-network connections. It should be noted that in some embodiments, network 100 may comprise multiple networks with different characteristics.

As referred to herein, a "blockchain action" may comprise any action including and/or related to blockchains and blockchain technology. For example, blockchain actions may include conducting transactions, querying a distributed ledger, generating additional blocks for a blockchain, transmitting communications-related nonfungible tokens, performing encryption/decryption, exchanging public/private keys, and/or other actions related to blockchains and blockchain technology. In some embodiments, a blockchain action may comprise the creation, modification, detection, and/or execution of a self-executing program or program stored on a blockchain. For example, a self-executing program may comprise a program stored on a blockchain that is executed (e.g., automatically and/or without any intermediary's involvement or time loss) when one or more predetermined conditions are met. In some embodiments, a blockchain action may comprise the creation, modification, exchange, and/or review of a token (e.g., a digital blockchain-specific asset), including a nonfungible token. A nonfungible token may comprise a token that is associated with a good, a service, a self-executing program, and/or other content that may be verified by, and stored using, blockchain technology. In some embodiments, blockchain actions may also comprise actions related to mechanisms that facilitate other blockchain actions (e.g., actions related to metering activities for blockchain actions on a given blockchain network).

When doing so, the system may not only identify and/or label each self-executing program in the first plurality of self-executing programs, but the system may also identify and/or label the relationships between each self-executing program in the first plurality of self-executing programs. By doing so, the system may use these relationships in order to perform blockchain actions that require coordination (e.g., serial processing, parallel processing, etc.) between self-executing programs as well as determine potential options (e.g., which one or more self-executing programs to use) to perform a blockchain action. The system may also identify the characteristics of each self-executing program in the first plurality of self-executing programs. By doing so, the system may filter between and/or select a self-executing program in the first plurality of self-executing programs that meets predetermined requirements.

As such, any entity (e.g., a legacy computing system and/or another self-executing program) that requests access to a self-executing program may first receive information about a characteristic of the self-executing program such as the status of its validation (if any). For example, the network mapping may provide information related to subjects such as functionality verification (e.g., formal verification), performance optimization and minimization of network resource usage, potential security vulnerabilities, and lack of trustworthy data feeds (e.g., security, data correctness). As the request is interfacing with the network mapping as opposed to the underlying self-executing program, the request does not run the risk of corruption and/or other unexpected behaviors by accessing the code of the self-executing program directly. Accordingly, any entity wishing to access self-executing programs on a blockchain may first interface with the network mapping to determine a risk associated with the underlying self-executing program. By doing so, the entity may receive an output from the network mapping indicating a particular validation method, validation protocol, and/or source of the self-executing program or its underlying code.

For example, system 110 may receive a first user request to generate a mapping of a first network, wherein the mapping indicates self-executing program characteristics corresponding to each self-executing program of a first plurality of self-executing programs. For example, the system may receive a request to generate a map or index of all self-executing programs (e.g., smart contracts) and associated self-executing programs, and/or other applications (e.g., oracles, network bridges, linked databases, DeFi (decentralized finance) systems) running on or on top of network 100.

Furthermore, the system may identify specific self-executing program characteristics. As described herein, a "self-executing program characteristic" may comprise any characteristic of a program, self-executing program, and/or combination thereof (including its underlying code) that distinguishes it from another program, self-executing program, and/or combination thereof (including its underlying code). For example, a self-executing program characteristic may comprise a security certificate, a specific code origination identifier, a specific program validator, a specific digital asset, a specific signing procedure, a number of signatures, and/or other characteristics described herein.

In some embodiments, a self-executing program characteristic may be compared against a "self-executing program requirement." For example, a required self-executing program characteristic may comprise a self-executing program characteristic required by a requesting entity in order for the requesting entity to use a self-executing program. For example, a self-executing program requirement may comprise a required security certificate, a required code origination identifier, a required program validator, a required digital asset, a required signing procedure, a required number of signatures, and/or other required characteristics described herein.

The use of the network mapping also provides additional technical benefits. Using the network mapping, the system may not only enforce requirements for particular security credentials/certificates but may also enforce other requirements on the underlying transaction. These other requirements may include obfuscating specific details related to the transaction from publication on the blockchain (e.g., to preserve privacy), providing additional execution requirements (e.g., based on know-your-customer protocols, government regulations, etc.), and/or providing additional functionality (e.g., generating supplemental notifications, triggering other transactions, etc.). For example, the system may add a specific privacy requirement that causes an interest rate in a transaction to be hidden, but still allows for the transaction itself to be validated and recorded on the blockchain. The system may accomplish this by encrypting the underlying self-executing program such that it is not public despite the self-executing program being published to the blockchain.

The use of the network mapping to conduct blockchain actions also provides yet additional technical benefit in that while it does not require a permissioned blockchain, it also does not require a layer two blockchain solution to achieve the aforementioned benefits. As such, the system is a layer one blockchain solution (e.g., an on-chain networking solution that may process and complete blockchain actions on its own blockchain) that works within existing protocols and does not require additional architecture on top of an existing blockchain. Accordingly, the system is highly flexible and scalable.

The system may also record the relationships between network entities. For example, the system may determine respective relationships between each self-executing program in the first plurality of self-executing programs and other self-executing programs in the first plurality of self-executing programs. For example, the system may record relationship 106 between the various entities in network 100. The system may generate a network map of the various relationships in order to determine network routes for performing blockchain actions.

In some embodiments, the system may further use one or more artificial intelligence models to generate a network map, determine network routes for performing blockchain actions, parse self-executing programs for self-executing program characteristics, and/or other activities for conducting blockchain actions based on network mappings of self-executing program characteristics.

System 110 also includes a model, which may be a machine learning model, artificial intelligence model, etc. (which may be referred collectively as "models" herein). The model may take inputs and provide outputs. The inputs may include multiple datasets, such as a training dataset and a test dataset. Each of the plurality of datasets may include data subsets related to user data, predicted forecasts and/or errors, and/or actual forecasts and/or errors. In some embodiments, outputs may be fed back to the model as input to train the model (e.g., alone or in conjunction with user indications of the accuracy of outputs, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., to generate a network map, determine network routes for performing blockchain actions, parse self-executing programs for self-executing program characteristics, and/or perform other activities for conducting blockchain actions based on network mappings of self-executing program characteristics).

In a variety of embodiments, the model may update its configurations (e.g., weights, biases, or other parameters) based on the assessment of its prediction (e.g., outputs) and reference feedback information (e.g., user indication of accuracy, reference labels, or other information). In a variety of embodiments, where the model is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model may be trained to generate better predictions.

In some embodiments, the system may access information about a self-executing program through one or more shell programs. It should be noted that the use of shell programs and other indicia for blockchain networks are described in U.S. patent application Ser. No. 18/063,052, "SYSTEMS AND METHODS FOR GENERATING SHELL-WRAPPED SELF-EXECUTING PROGRAMS FOR CONDUCTING CRYPTOGRAPHICALLY SECURE ACTIONS," as filed on Dec. 7, 2022, which is hereby incorporated by reference in its entirety. It should be noted that the use of virtual blockchain networks are described in U.S. patent application Ser. No. 18/062,090, "SYSTEMS AND METHODS FOR CONDUCTING CRYPTOGRAPHICALLY SECURE ACTIONS IN PUBLIC, NON-PERMISSIONED BLOCKCHAINS USING BIFURCATED SELF-EXECUTING PROGRAMS," as filed on Dec. 6, 2022, which is hereby incorporated by reference in its entirety.

Figure 2:
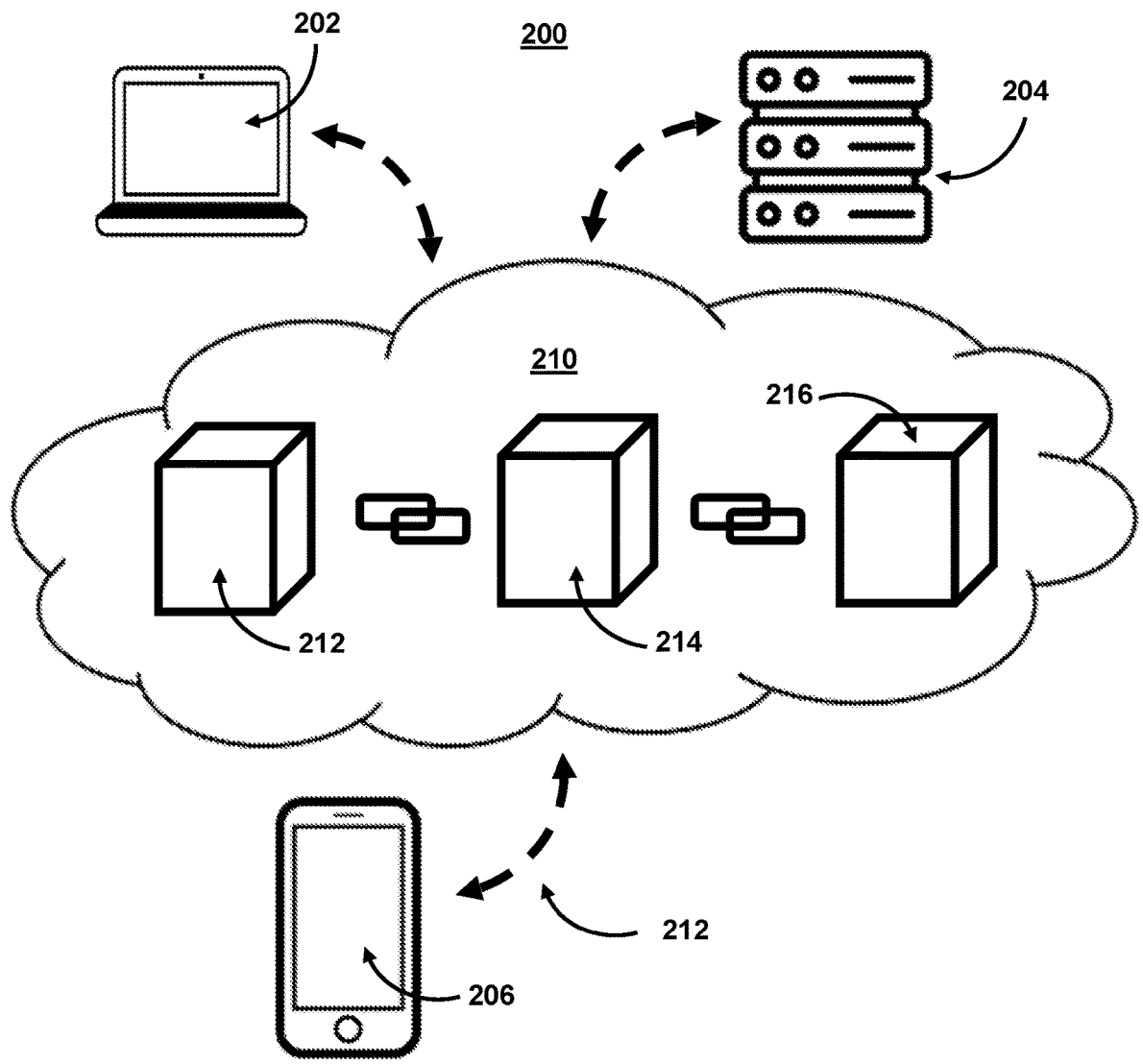
FIG. 2 shows an illustrative diagram of a blockchain network, in accordance with one or more embodiments.

FIG. 2 shows an illustrative diagram of a blockchain network, in accordance with one or more embodiments. For example, system 200 may comprise a distributed state machine, in which each of the components in FIG. 2 acts as a client of system 200. For example, system 200 (as well as other systems described herein) may comprise a large data structure that holds not only all accounts and balances but also a state machine, which can change from block to block according to a predefined set of rules and which can execute arbitrary machine code. The specific rules of changing state from block to block may be maintained by a virtual machine (e.g., a computer file implemented on and/or accessible by one or more client, which behaves like an actual computer) for the system. The data structure may comprise one or more devices and/or components, which may act in concert to facilitate blockchain 210.

As referred to herein, blockchain 210 may comprise a type of distributed ledger technology that consists of growing lists of records, called blocks (e.g., block 212, block 214, and block 216), that are securely linked together using cryptography. Each block may contain a cryptographic hash of the previous block (e.g., block 216 may contain a cryptographic hash of block 214), and that cryptographic hash may itself be based on a state of a preceding block (e.g., the cryptographic hash of block 216 is based not only on the state of block 214, but also block 212). For example, each block may include a timestamp and blockchain action data (e.g., represented as a Merkle tree, where data nodes are represented by leaves). The timestamp proves that the blockchain action data (e.g., the state of the block) existed when the block was created. As each block is based on information about the previous block, the blocks effectively form a chain with each additional block linking to the ones before it. Consequently, blockchain actions are irreversible in that, once they are recorded, the data in any given block cannot be altered retroactively without altering all subsequent blocks.

Blockchains are typically managed by a peer-to-peer (P2P) computer network for use as a public distributed ledger, where nodes collectively adhere to a consensus algorithm protocol to add and validate new transaction blocks. Although, in some embodiments, a blockchain may be managed by a private consortium of computers. While blockchain records are not unalterable, since blockchain forks are possible, blockchains may be considered secure by design and exemplify a distributed computing system with high Byzantine fault tolerance.

As shown in FIG. 2, system 200 comprises user device 202, user device 204, and user device 206. It should be noted that, while shown as a smartphone, a personal computer, and a server in FIG. 2, the user devices may be any type of computing device, including, but not limited to, a laptop computer, a tablet computer, a handheld computer, and/or other computing equipment (e.g., a server), including "smart," wireless, wearable, and/or mobile devices. It should be noted that embodiments describing system 200 performing a blockchain action may equally be applied to, and correspond to, an individual user device (e.g., user device 202, user device 204, and/or user device 206) performing the blockchain action. That is, system 200 may correspond to the user devices (e.g., user device 202, user device 204, and/or user device 206) collectively or individually.

For example, system 200 may comprise a plurality of nodes for blockchain network 210. Each node may correspond to a user device (e.g., user device 202, user device 204, and/or user device 206). A node for a blockchain network may comprise an application or other software that records and/or monitors peer connections to other nodes and/or miners for the blockchain network. For example, a miner comprises a node in a blockchain network that facilitates blockchain actions by verifying blockchain actions on the blockchain, adding new blocks to the existing chain, and/or ensuring that these additions are accurate. The nodes may continually record the state of the blockchain and respond to remote procedure requests for information about the blockchain.

In some embodiments, the user devices of system 200 may comprise one or more cloud components. For example, cloud components may be implemented as a cloud computing system and may feature one or more component devices. It should also be noted that system 200 is not limited to three devices. Users may, for instance, utilize one or more devices to interact with one another, one or more servers, or other components of system 200. It should be further noted that while one or more actions (e.g., blockchain actions) are described herein as being performed by a particular component (e.g., user device 202) of system 200, those actions may, in some embodiments, be performed by other components of system 200. As an example, while one or more actions are described herein as being performed by components of user device 202, those actions may, in some embodiments, be performed by one or more cloud components. In some embodiments, the various computers and systems described herein may include one or more computing devices that are programmed to perform the described functions. Additionally, or alternatively, multiple users may interact with system 200 and/or one or more components of system 200. For example, in one embodiment, a first user and a second user may interact with system 200 using two different components (e.g., user device 204 and user device 206, respectively). Additionally, or alternatively, a single user (and/or a user account linked to a single user) may interact with system 200 and/or one or more components of system 200 using two different components (e.g., user device 202 and user device 206, respectively).

With respect to the components of system 200, each of these devices may receive content and data via input/output (hereinafter "I/O") paths using I/O circuitry. Each of these devices may also include processors and/or control circuitry to send and receive commands, requests, and other suitable data using the I/O paths. The control circuitry may comprise any suitable processing, storage, and/or I/O circuitry. Each of these devices may also include a user input interface and/or user output interface (e.g., a display) for use in receiving and displaying data. For example, as shown in FIG. 2, both user device 202 and user device 206 include a display upon which to display data (e.g., content related to one or more blockchain actions).

Additionally, the devices in system 200 may run an application (or another suitable program). The application may cause the processors and/or control circuitry to perform operations related to conducting blockchain actions based on network mappings of self-executing program characteristics within a decentralized application environment.

Each of these devices may also include electronic storage. The electronic storages may include non-transitory storage media that electronically stores information. The electronic storage media of the electronic storages may include one or both of (i) system storage that is provided integrally (e.g., is substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more optically readable storage media (e.g., optical disk, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 2 also includes network 212, which may comprise communication paths between user devices. The communication paths may include the Internet, a mobile phone network, a mobile voice or data network (e.g., a 5G or LTE network), a cable network, a public switched telephone network, or other types of communication networks or combinations of communication networks. The communication paths may separately or together include one or more communication paths, such as a satellite path, a fiber-optic path, a cable path, a path that supports Internet communications (e.g., IPTV), free-space connections (e.g., for broadcast or other wireless signals), or any other suitable wired or wireless communication path or combination of such paths. The computing devices may include additional communication paths linking a plurality of hardware, software, and/or firmware components operating together. For example, the computing devices may be implemented by a cloud of computing platforms operating together as the computing devices.

Figure 3:
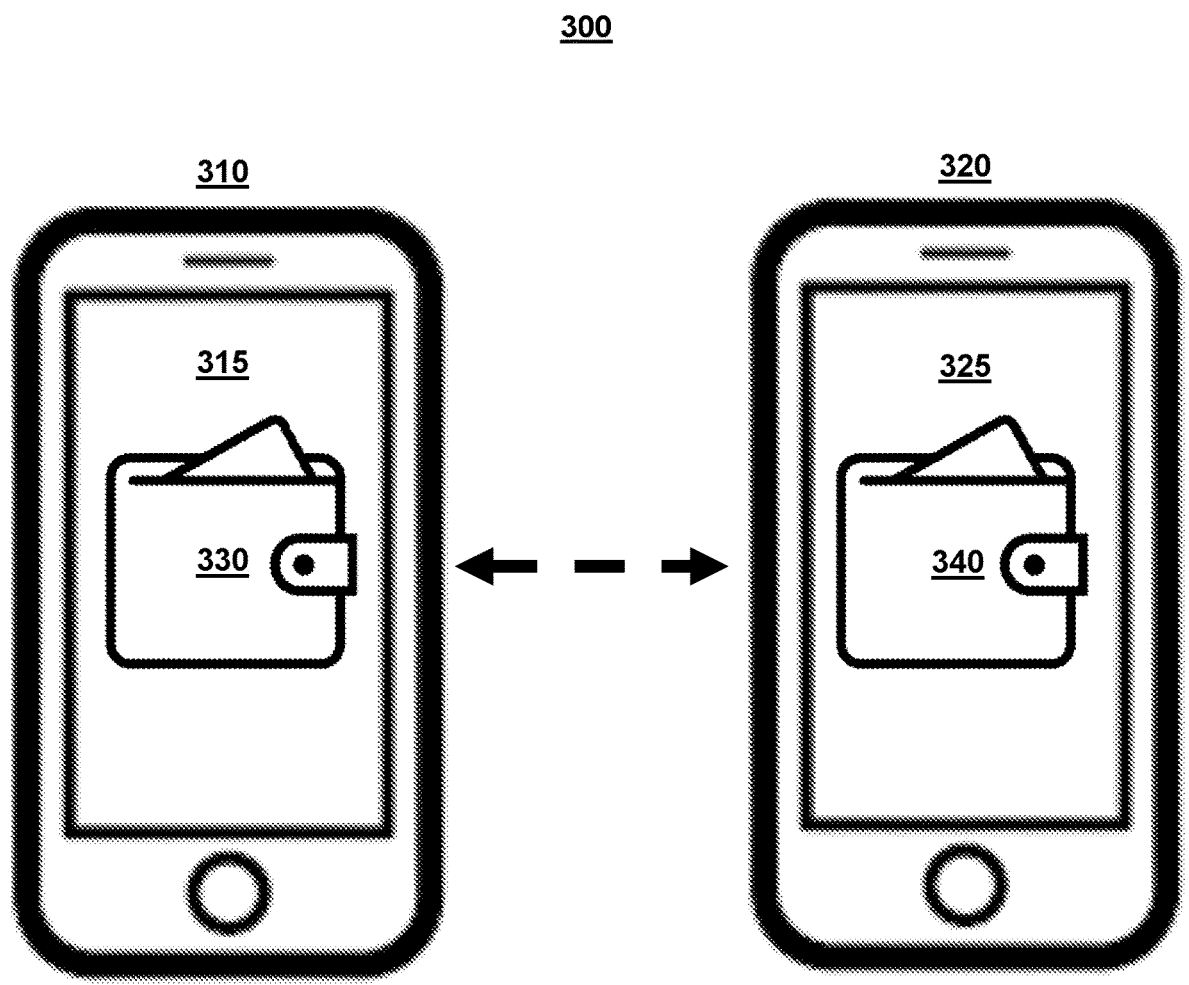
FIG. 3 shows an illustrative diagram for performing a blockchain action, in accordance with one or more embodiments.

FIG. 3 shows an illustrative diagram for conducting blockchain actions, in accordance with one or more embodiments. For example, the diagram presents various components that may be used to conduct blockchain actions based on network mappings of self-executing program characteristics in some embodiments.

FIG. 3 includes system 300, which includes user device 310 and user device 320, although other devices and/or components may also be featured in system 300 (e.g., one or more of devices and/or components shown in FIG. 2). User device 310 includes user interface 315. User device 320 includes user interface 325. As referred to herein, a "user interface" may comprise a mechanism for human-computer interaction and communication in a device and may include display screens, keyboards, a mouse, and the appearance of a desktop. For example, a user interface may comprise a way for a user to interact with and/or access an application, website, and/or other program in order to conduct blockchain actions based on network mappings of self-executing program characteristics. A user interface may display content related to network mappings. As referred to herein, "content" should be understood to mean an electronically consumable user asset, representations of goods or services (including nonfungible tokens), Internet content (e.g., streaming content, downloadable content, webcasts, etc.), video data, audio data, image data, and/or textual data, etc.

In some embodiments, gas may be obtained as part of a blockchain action (e.g., a purchase) using a network-specific cryptocurrency (e.g., ether in the case of Ethereum). The system may require gas (or the amount of the network-specific cryptocurrency corresponding to the required amount of gas) to be transmitted with the blockchain action as an earmark to the blockchain action. In some embodiments, gas that is earmarked for a blockchain action may be refunded back to the originator of the blockchain action if, after the computation is executed, an amount remains unused.

As shown in FIG. 3, one or more user devices may include a cryptography-based, storage application (e.g., cryptography-based, storage application 330 and cryptography-based, storage application 340) used to perform blockchain actions. The cryptography-based, storage application may be used to perform a plurality of blockchain actions across a computer network. For example, the cryptography-based, storage application may comprise a decentralized application that functions to perform one or more blockchain actions.

In some embodiments, the cryptography-based, storage application may comprise and/or be compatible with one or more application program interfaces (e.g., APIs). For example, an API may be implemented on user device 310 and/or communicate with an API implemented on user device 320. Alternatively or additionally, an API may reside on one or more cloud components. For example, an API may reside on a server and comprise a platform service for a custodial wallet service, decentralized application, etc. An API (which may be a representational state transfer (REST) or web services API layer) may provide a decoupled interface to data and/or functionality of one or more applications.

The API may provide various low-level and/or blockchain-specific operations in order to facilitate blockchain actions. For example, the API may provide blockchain actions such as blockchain writes. Furthermore, the API may perform a transfer validation ahead of forwarding the blockchain action (e.g., a transaction) to another service (e.g., a crypto service). The API may then log the outcome. For example, by logging to the blockchain prior to forwarding, the API may maintain internal records and balances without relying on external verification (e.g., which may take up to ten minutes based on blockchain updating activity).

The API may also provide informational reads. For example, the API (or a platform service powered by the API) may generate blockchain action logs and write to an additional ledger (e.g., an internal record and/or indexer service) the outcome of the reads. If this is done, a user accessing the information through other means may see consistent information such that downstream users ingest the same data point as the user. The API may also provide a unified API to access balances, transaction histories, and/or other blockchain actions activity records between one or more decentralized applications and custodial user accounts. By doing so, the system maintains the security of sensitive information such as the balances and transaction history. Alternatively, a mechanism for maintaining such security would separate the API access between the decentralized applications and custodial user accounts through the use of special logic. The introduction of the special logic decreases the streamlining of the system, which may result in system errors based on divergence and reconciliation.

The API may provide a common, language-agnostic way of interacting with an application. In some embodiments, the API may comprise a web services API that offers a well-defined contract that describes the services in terms of their operations and the data types used to exchange information. REST APIs do not typically have this contract; instead, they are documented with client libraries for most common languages including Ruby, Java, PHP, and JavaScript. Simple Object Access Protocol (SOAP) web services have traditionally been adopted in the enterprise for publishing internal services as well as for exchanging information with partners in business-to-business (B2B) transactions.

The API may use various architectural arrangements. For example, system 300 may be partially based on the API, such that there is strong adoption of SOAP and RESTful web services, using resources such as Service Repository and Developer Portal, but with low governance, standardization, and separation of concerns. Alternatively, system 300 may be fully based on the API, such that separation of concerns between layers such as an API layer, services, and applications are in place.

In some embodiments, the system architecture may use a microservice approach. Such systems may use two types of layers: front-end layers and back-end layers, where microservices reside. In this kind of architecture, the role of the API may be to provide integration between front-end and back-end layers. In such cases, the API may use RESTful APIs (exposition to front-end or even communication between microservices). The API may use the Advanced Message Queuing Protocol (AMQP), which is an open standard for passing business messages between applications or organizations. The API may use an open-source, high-performance remote procedure call (RPC) framework that may run in a decentralized application environment. In some embodiments, the system architecture may use an open API approach. In such cases, the API may use commercial or open-source API platforms and their modules.

The API may use a developer portal. The API may use strong security constraints applying a web application firewall that protects the decentralized applications and/or the API against common web exploits, bots, and denial-of-service (DDOS) attacks. The API may use RESTful APIs as standard for external integration.

In some embodiments, the system may also use one or more Application Binary Interfaces (ABIs) and an alternative to and/or in addition to an API. An ABI is an interface between two program modules, often between operating systems and user programs. ABIs may be specific to a blockchain protocol. For example, ABI defines the methods and structures used to interact with the binary contract similar to an API, but on a lower level. The ABI indicates to the caller of the function to encode (e.g., with ABI encoding) the needed information, such as function signatures and variable declarations, in a format that a virtual machine can understand to call that function in bytecode. ABI encoding may be automated by the system using compilers or wallets interacting with the blockchain.

The cryptography-based, storage application may, in some embodiments, correspond to a digital wallet. For example, the digital wallet may comprise a repository that allows users to store, manage, and trade their cryptocurrencies and assets, interact with blockchains, and/or conduct blockchain actions using one or more applications. The digital wallet may be specific to a given blockchain protocol or may provide access to multiple blockchain protocols. In some embodiments, the system may use various types of digital wallets such as hot wallets and cold wallets. Hot wallets are connected to the internet while cold wallets are not. Digital wallet holders may hold both a hot wallet and a cold wallet. Hot wallets are most often used to perform blockchain actions, while a cold wallet is generally used for managing a user account and may have no connection to the internet.

In some embodiments, the cryptography-based, storage application may correspond to a key-based wallet or a smart contract wallet. For example, a key-based wallet may feature public or private keys and allow a user to either have control of the account or receive transactions in the account. A smart contract wallet may comprise blockchain programs or digital agreements that execute transactions between parties once a predetermined condition is met. For example, a smart contract wallet may be managed by a smart contract (e.g., or smart contract code) instead of a private key. As such, a smart contract wallet may improve speed, accuracy, trust, and/or transparency in blockchain actions. In some embodiments, a cryptography-based, storage application may include, or have access to, a key-based wallet or a smart contract wallet. For example, the cryptography-based, storage application may comprise a digital or other construct (e.g., a reference, a pointer, a text on a blockchain, an address, etc.).

In some embodiments, to conduct a blockchain action, user device 310, user interface 315, and/or cryptography-based, storage application 330 may comprise, control, and/or have access to a private key and/or digital signature. For example, system 300 may use cryptographic systems for conducting blockchain actions. For example, system 300 may use public-key cryptography, which features a pair of digital keys (e.g., which may comprise strings of data). In such cases, each pair comprises a public key (e.g., which may be public) and a private key (e.g., which may be kept private). System 300 may generate the key pairs using cryptographic algorithms (e.g., featuring one-way functions). System 300 may then encrypt a message (or other blockchain action) using an intended receiver's public key such that the encrypted message may be decrypted only with the receiver's corresponding private key. In some embodiments, system 300 may combine a message with a private key to create a digital signature on the message. For example, the digital signature may be used to verify the authenticity of blockchain actions. As an illustration, when conducting blockchain actions, system 300 may use the digital signature to prove to every node in the system that it is authorized to conduct the blockchain actions.

For example, user device 310 may request a blockchain action (e.g., conduct a transaction). The blockchain action may be authenticated by user device 310 and/or another node (e.g., a user device in the community network of system 300). For example, using cryptographic keys, system 300 may identify users and give access to their respective user accounts (e.g., corresponding digital wallets) within system 300. Using private keys (e.g., known only to the respective users) and public keys (e.g., known to the community network), system 300 may create digital signatures to authenticate the users.

Following an authentication of the blockchain action, the blockchain action may be authorized. For example, after the blockchain action is authenticated between the users, system 300 may authorize the blockchain action prior to adding it to the blockchain. System 300 may add the blockchain action to a blockchain (e.g., blockchain 210 (FIG. 2)) as part of a new block (e.g., block 216 (FIG. 2)). System 300 may perform this based on a consensus of the user devices within system 300. For example, system 300 may rely on a majority (or other metric) of the nodes in the community network to determine that the blockchain action is valid. In response to validation of the block, a node user device (e.g., user device 320) in the community network (e.g., a miner) may receive a reward (e.g., in a given cryptocurrency) as an incentive for validating the block.

To validate the blockchain action, system 300 may use one or more validation protocols and/or validation mechanisms. For example, system 300 may use a proof-of-work mechanism in which a user device must provide evidence that it performed computational work to validate a blockchain action and thus this mechanism provides a manner for achieving consensus in a decentralized manner as well as preventing fraudulent validations. For example, the proof-of-work mechanism may involve iterations of a hashing algorithm. The user device that is successful aggregates and records blockchain actions from a mempool (e.g., a collection of all valid blockchain actions waiting to be confirmed by the blockchain network) into the next block. Alternatively or additionally, system 300 may use a proof-of-stake mechanism in which a user account (e.g., corresponding to a node on the blockchain network) is required to have, or "stake," a predetermined amount of tokens in order for system 300 to recognize it as a validator in the blockchain network.

In response to validation of the block, the block is added to a blockchain (e.g., blockchain 210 (FIG. 2)), and the blockchain action is completed. For example, to add the blockchain action to a blockchain, the successful node (e.g., the successful miner) encapsulates the blockchain action in a new block before transmitting the block throughout system 300.

In some embodiments, a cryptography-based, storage application may comprise a decentralized application. As referred to herein, a "decentralized application" may comprise an application that exists on a blockchain and/or a peer-to-peer network. For example, a decentralized application may comprise an application that has a back end that is in part powered by a decentralized peer-to-peer network such as a decentralized, open-source blockchain with smart contract functionality.

For example, the cryptography-based, storage application (e.g., cryptography-based, storage application 330) may allow a user device (e.g., user device 310) to share files, access, and/or perform a blockchain action with another user device (e.g., user device 320) and/or cryptography-based, storage application (e.g., cryptography-based, storage application 340). For example, the peer-to-peer architecture and decentralized nature allows blockchain actions to be conducted between the user devices, without the need of any intermediaries or central authorities.

Figure 4:
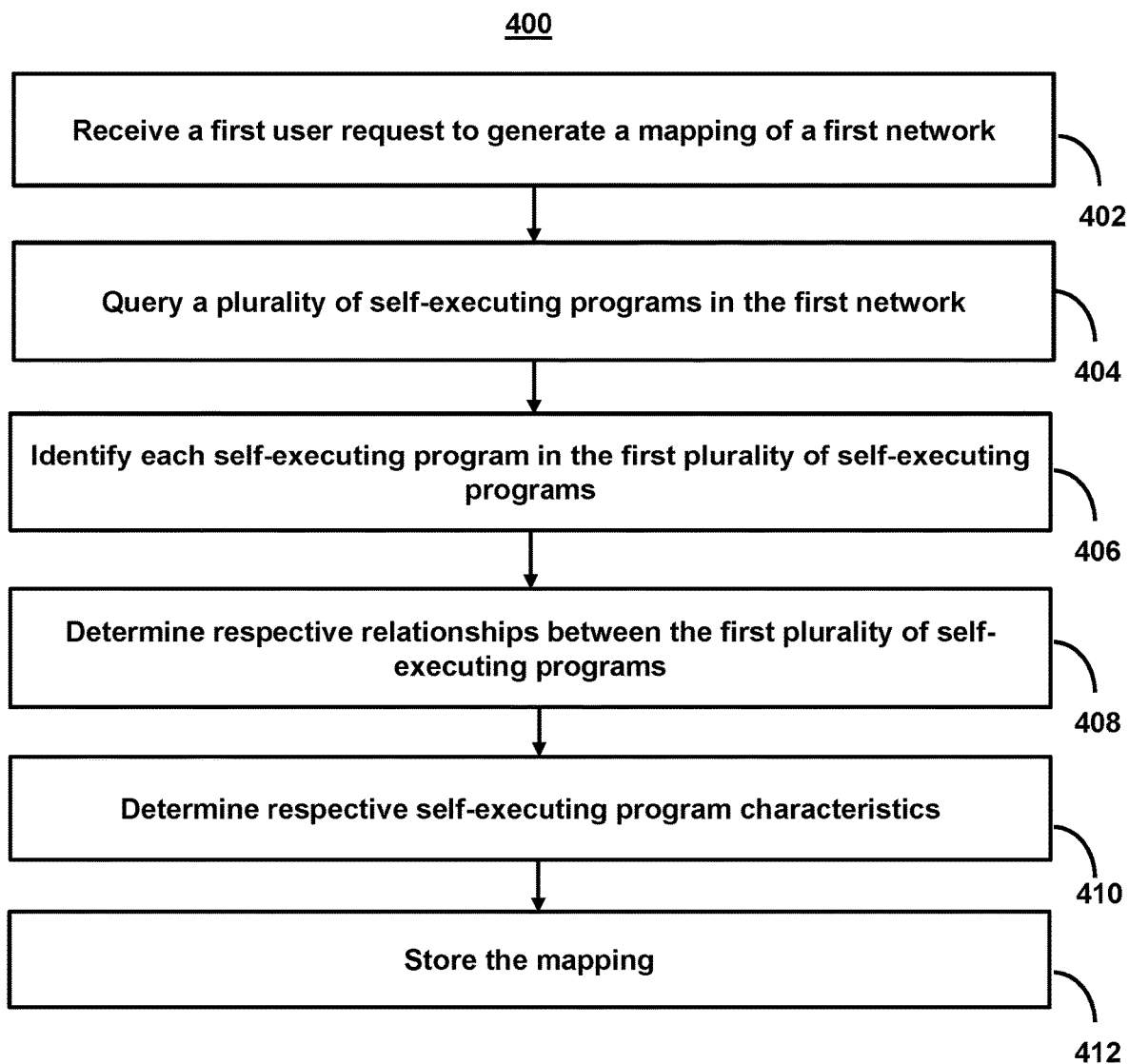
FIG. 4 shows a flowchart of the steps involved in generating network mappings of self-executing program characteristics, in accordance with one or more embodiments.

FIG. 4 shows a flowchart of the steps involved in generating network mappings of self-executing program characteristics, in accordance with one or more embodiments. For example, the system may use process 400 (e.g., as implemented on one or more system components described above) in order to generate a mapping. For example, to map the applications on a computer network, a system may first need to identify all self-executing programs (e.g., smart contracts), associated self-executing programs, and other applications (e.g., oracles, network bridges, linked databases, decentralized systems) running on or on top of the network, along with their specific requirements and characteristics. This could involve conducting a network assessment or inventory to identify all the devices and systems connected to the network, as well as the applications and services running on those devices.

Once a complete inventory is obtained, the system may then evaluate each one in terms of particular requirements (e.g., compliance, security, etc.). As such, the system may determine specific configuration and attributes of each application, device, and program, and identify any potential conflicts with predetermined criteria (e.g., compliance, security, etc.) or compatibility issues.

At step 402, process 400 (e.g., using one or more components described above) receives a first user request to generate a mapping of a first network. For example, the system may receive a first user request to generate a mapping of a first network, wherein the mapping indicates self-executing program characteristics corresponding to each self-executing program of a first plurality of self-executing programs. For example, the system may generate a map or index of all self-executing programs (e.g., smart contracts) and associated self-executing programs, and/or other applications (e.g., oracles, network bridges, linked databases, DeFi systems) running on or on top of a blockchain network. Furthermore, the system may identify specific self-executing program characteristics.

At step 404, process 400 (e.g., using one or more components described above) queries a plurality of self-executing programs in the first network. For example, the system may, in response to the first user request, query the first plurality of self-executing programs to generate the mapping. For example, to generate the mapping, the system may iterate through and/or index all self-executing programs (e.g., smart contracts), associated self-executing programs, and/or other applications (e.g., oracles, network bridges, linked databases, DeFi systems) running on or on top of a blockchain network. When doing so, the system may not only identify and/or label each self-executing program in the first plurality of self-executing programs, but the system may also identify and/or label the relationships between each self-executing program in the first plurality of self-executing programs. By doing so, the system may use these relationships in order to perform blockchain actions that require coordination (e.g., serial processing, parallel processing, etc.) between self-executing programs as well as determine potential options (e.g., which one or more self-executing programs to use) to perform a blockchain action. The system may also identify the characteristics of each self-executing program in the first plurality of self-executing programs. By doing so, the system may filter between and/or select a self-executing program in the first plurality of self-executing programs that meets predetermined requirements.

At step 406, process 400 (e.g., using one or more components described above) identifies each self-executing program in the first plurality of self-executing programs. For example, the system may identify each self-executing program in the first plurality of self-executing programs. By doing so, the system may determine what self-executing programs are available in the network.

At step 408, process 400 (e.g., using one or more components described above) determines respective relationships between the first plurality of self-executing programs. For example, the system may determine respective relationships between each self-executing program in the first plurality of self-executing programs and other self-executing programs in the first plurality of self-executing programs. By doing so, the system may determine which self-executing programs rely on other programs, which may be used to conduct one or more blockchain actions (e.g., actions that require a combination of self-executing programs).

At step 410, process 400 (e.g., using one or more components described above) determines respective self-executing program characteristics. For example, the system may determine respective self-executing program characteristics for each self-executing program in the first plurality of self-executing programs. By doing so, the system may compare these characteristics to requirements for a blockchain action.

At step 412, process 400 (e.g., using one or more components described above) stores the mapping. For example, the system may store the mapping for conducting blockchain actions and/or facilitate other actions. For example, the system may receive a second user request to perform a first blockchain action using the first network, wherein the second user request comprises a first self-executing program requirement. The system may determine, based on the mapping, a second plurality of self-executing programs corresponding to the first self-executing program requirement and the first blockchain action. The system may generate a first recommendation for performing the first blockchain action using the second plurality of self-executing programs.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

Figure 5:
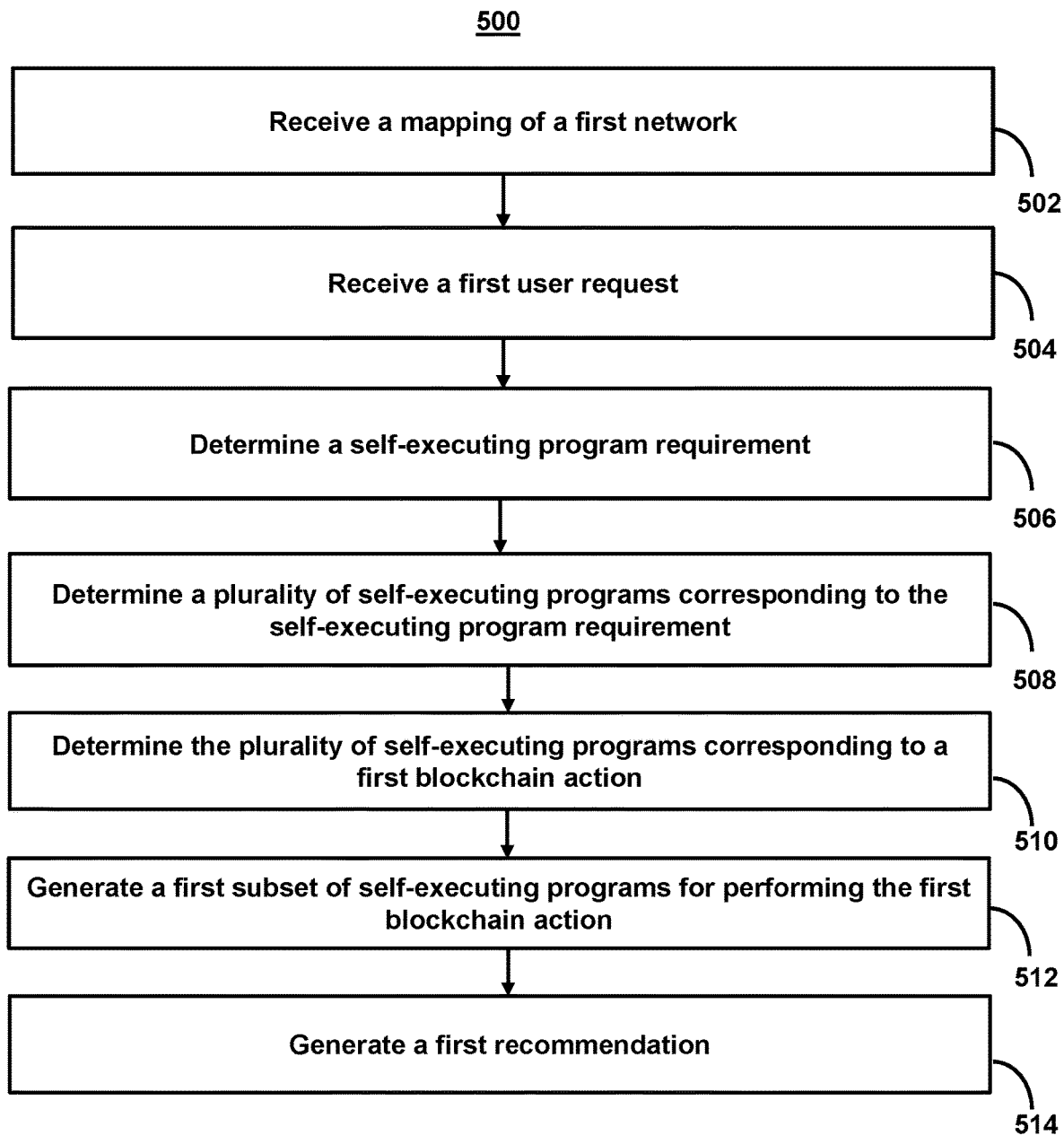
FIG. 5 shows a flowchart of the steps involved in conducting blockchain actions based on the network mappings, in accordance with one or more embodiments.

FIG. 5 shows a flowchart of the steps involved in conducting blockchain actions based on the network mappings, in accordance with one or more embodiments. For example, having mapped the network design and configuration, the system may constrain the ability of network users to only use self-executing programs and other applications that are compliant with the predetermined criteria. By doing so, the system optimizes usage of the network given particular user needs, such as protection of sensitive data (e.g., using zero knowledge proofs, homomorphic encryption, etc.). Additionally or alternatively, the system may ensure that the mapping and requirements enforcement is reliable and efficient, and may identify any potential issues or problems. That is, the system may provide recommendation for both conduction actions on a network, but also recommendations on the most efficient and/or beneficial manner in which to conduct those actions.

At step 502, process 500 (e.g., using one or more components described above) receives a mapping of a first network. For example, the system may receive a mapping of a first network, wherein the mapping indicates self-executing program characteristics corresponding to each self-executing program of a first plurality of self-executing programs. For example, the system may generate a map or index of all self-executing programs (e.g., smart contracts) and associated self-executing programs, and/or other applications (e.g., oracles, network bridges, linked databases, DeFi systems) running on or on top of a blockchain network. Furthermore, the system may identify specific self-executing program characteristics.

At step 504, process 500 (e.g., using one or more components described above) receives a first user request. For example, the system may receive a first user request to perform a first blockchain action using the first network. For example, the system may receive a user request to perform one or more actions involving one or more self-executing programs, associated self-executing programs, and/or other applications (e.g., oracles, network bridges, linked databases, DeFi systems) running on or on top of a blockchain network.

At step 506, process 500 (e.g., using one or more components described above) determines a self-executing program requirement. For example, the system may determine a first self-executing program requirement for the first user request. For example, the system may also receive (e.g., along with a request to perform a blockchain action) a requirement that certain criteria be met when performing the action. These criteria may be expressed to the system in the form of one or more self-executing program requirements (e.g., based on upholding compliance, security, etc.).

At step 508, process 500 (e.g., using one or more components described above) determines a plurality of self-executing programs corresponding to the self-executing program requirement. For example, the system may determine, based on the mapping, a second plurality of self-executing programs corresponding to the first self-executing program requirement. The system may access the mapping of the blockchain network and determine a plurality of self-executing programs (e.g., a subset of all of the self-executing programs, associated self-executing programs, and/or other applications on the network) that correspond to the requirement. For example, the system may filter the available self-executing programs on the network for those that correspond to the requirement.

For example, to identify a plurality of self-executing programs that are suitable for performing the blockchain action, the system may determine whether one or more self-executing program characteristics for a self-executing program correspond to (or conflict with) the self-executing program requirement. For example, the system may receive the mapping of the first network. The system may then compare the first self-executing program requirement to the self-executing program characteristics corresponding to each self-executing program of the first plurality of self-executing programs.

In some embodiments, the system may further filter the self-executing programs to ensure that only known entities (or self-executing programs corresponding to known entities) are used. For example, the system may retrieve a list of known entities. The system may filter the first subset based on the list of known entities to generate a second subset of self-executing programs for performing the first blockchain action. The system may generate a second recommendation, on the first user device, for performing the first blockchain action using the second subset.

In some embodiments, the system may independently validate known entities and/or label known entities. The system may then further filter the self-executing programs to ensure that only known entities (or self-executing programs corresponding to known entities) are used. For example, the system may retrieve known entity labels validated by a blockchain platform service. The system may filter the first subset based on the known entity labels to generate a second subset of self-executing programs for performing the first blockchain action. The system may generate a second recommendation, on the first user device, for performing the first blockchain action using the second subset.

In some embodiments, the system may use characteristics of different types of assets and/or whether or not asset types are supported to select self-executing programs for performing the first blockchain action. For example, the system may require a blockchain action to be performed using a particular type of cryptocurrency. In such cases, determining the second plurality of self-executing programs corresponding to the first self-executing program requirement may further comprise the system determining an asset characteristic for the first blockchain action and filtering the first plurality of self-executing programs based on whether each of the first plurality of self-executing programs supports the asset characteristic.

At step 510, process 500 (e.g., using one or more components described above) determines the plurality of self-executing programs corresponding to a first blockchain action. For example, the system may determine a third plurality of self-executing programs corresponding to the first blockchain action. The system may determine the plurality of self-executing programs that corresponds to the blockchain action. For example, this may include a particular self-executing program that performs the blockchain action as well as a combination of self-executing programs (whether done simultaneously, serially, etc.) needed to perform the blockchain action.

In some embodiments, a blockchain action may require coordination (e.g., serial processing, parallel processing, etc.) between self-executing programs. For example, a single blockchain action may require multiple self-executing programs to be executed in series. For example, the system may determine a series of self-executing programs required to be serially executed to perform the first blockchain action. The system may assign each self-executing program in the series of self-executing programs to the third plurality of self-executing programs.

In some embodiments, a blockchain action may require coordination (e.g., serial processing, parallel processing, etc.) between self-executing programs. For example, a single blockchain action may require multiple self-executing programs to be executed in parallel and/or other combinations. For example, the system may determine a plurality of combinations of self-executing programs from the second plurality of self-executing programs required to be executed to perform the first blockchain action. The system may then assign each self-executing program of the self-executing programs in the plurality of combinations to the third plurality of self-executing programs.

In some embodiments, the system may use one or more artificial intelligence models to assist with performing a blockchain action. For example, the model may process the numerous self-executing programs, associated self-executing programs, and/or other applications (e.g., oracles, network bridges, linked databases, DeFi systems) running on or on top of a blockchain network to determine the optimal combination and/or recommendations for performing blockchain actions to the user. The model may receive inputs describing each self-executing program in the first plurality of self-executing programs, the relationships between each self-executing program in the first plurality of self-executing programs, and the characteristics of each self-executing program in the first plurality of self-executing programs. For example, in some embodiments, determining the plurality of combinations of the self-executing programs of the second plurality of self-executing programs required to be executed to perform the first blockchain action may comprise the system generating a feature input based on the plurality of combinations of the self-executing programs of the second plurality of self-executing programs. The system may then input the feature input into an artificial intelligence model to generate an output. The system may determine the first subset of the first plurality of self-executing programs based on the output.

At step 512, process 500 (e.g., using one or more components described above) generates a first subset of self-executing programs for performing the first blockchain action. For example, the system may filter the third plurality of self-executing programs based on the second plurality of self-executing programs to generate a first subset of self-executing programs for performing the first blockchain action. The system may then determine the self-executing program or programs that may both perform the blockchain action as well as meet the requirements set by the user request.

For example, when filtering self-executing programs, the system may filter individual blockchain networks based on the user request. For example, the system may filter each network based on a throughput speed corresponding to each network (e.g., a speed at which new blocks on a network are confirmed/minted), based on a protocol of the network, etc. For example, the system may determine a plurality of available networks for performing the first blockchain action. The system may filter the plurality of available networks based on the first user request.

In some embodiments, the system may use one or more artificial intelligence models to determine the first subset. For example, the model may receive inputs describing each self-executing program, the relationships between each self-executing program, and the characteristics of each self-executing program. For example, the system may generate a feature input based on the second plurality of self-executing programs. The system may input the feature input into an artificial intelligence model to generate an output. The system may determine the first subset of the first plurality of self-executing programs based on the output. For example, the system may convert the descriptions about each self-executing program, the relationships between each self-executing program, and the characteristics of each self-executing program into a format that may be ingested by the model. To do so, the system may determine a plurality of self-executing program characteristics for the second plurality of self-executing programs. The system may then generate an array of values representing the plurality of self-executing program characteristics.

At step 514, process 500 (e.g., using one or more components described above) generates a first recommendation. For example, the system may generate a first recommendation, on a first user device, for performing the first blockchain action using the first subset. For example, the recommendation may identify a particular self-executing program or a subset of programs for use in performing the blockchain action. In some embodiments, the system may rank various self-executing programs, network routes, combinations of programs, etc. for performing the blockchain action. In some embodiments, the system may provide a user with an option to execute the blockchain action. For example, the system may receive a third user request in response to the first recommendation. The system may execute the first blockchain action based on the first recommendation. Additionally or alternatively, the system may monitor for the blockchain action. For example, the system may monitor a blockchain network following the execution of a blockchain action. Upon determining that the action has been confirmed by the network, the system may generate a confirmation to the user. As such, the system may determine that the first blockchain action has been executed. The system may generate for display, on a user interface, a confirmation that the first blockchain action has been executed. based on the first recommendation In some embodiments, the system may further allow users to filter the self-executing programs based on additional selected requirements. In some embodiments, these requirements may request optimal routes and/or processing strategies (e.g., to minimize processing power, network fees, and/or time requirements). For example, the system may receive a second user request to apply a second self-executing program requirement. The system may filter the first subset based on the second self-executing program requirement to generate a second subset of self-executing programs for performing the first blockchain action. The system may generate a second recommendation, on the first user device, for performing the first blockchain action using the second subset.

In some embodiments, the system may determine multiple different self-executing programs and/or combinations thereof for performing the blockchain action. The system may then rank (e.g., based on characteristics of the self-executing programs, other predetermined criteria, and/or user preferences) those self-executing programs and/or combinations thereof. The system may then generate a recommendation based on those rankings. For example, the system may rank the first plurality of self-executing programs based on the first self-executing program requirement to generate a plurality of rankings. The system may filter the plurality of rankings based on a threshold ranking to determine the first subset.

Additionally or alternatively, if the system determines that there are no compliant self-executing programs, the system may generate for display a message informing the user and/or otherwise prevent the blockchain action.

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 5.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for conducting blockchain actions based on network mappings of self-executing program characteristics.

2. The method of any one of the preceding embodiments, the method comprising: receiving a mapping of a first network, wherein the mapping indicates self-executing program characteristics corresponding to each self-executing program of a first plurality of self-executing programs; receiving a first user request to perform a first blockchain action using the first network; determining a first self-executing program requirement for the first user request; determining, based on the mapping, a second plurality of self-executing programs corresponding to the first self-executing program requirement; determining a third plurality of self-executing programs corresponding to the first blockchain action; filtering the third plurality of self-executing programs based on the second plurality of self-executing programs to generate a first subset of self-executing programs for performing the first blockchain action; and generating a first recommendation, on a first user device, for performing the first blockchain action using the first subset.

3. The method of any one of the preceding embodiments, wherein determining the second plurality of self-executing programs corresponding to the first self-executing program requirement further comprises: receiving the mapping of the first network; and comparing the first self-executing program requirement to the self-executing program characteristics corresponding to each self-executing program of the first plurality of self-executing programs.

4. The method of any one of the preceding embodiments, wherein the mapping is generated by: identifying each self-executing program in the first plurality of self-executing programs; determining respective relationships between each self-executing program in the first plurality of self-executing programs and other self-executing programs in the first plurality of self-executing programs; and recording the respective relationships.

5. The method of any one of the preceding embodiments, wherein determining the third plurality of self-executing programs corresponding to the first blockchain action further comprises: determining a series of self-executing programs required to be serially executed to perform the first blockchain action; and assigning each self-executing program in the series of self-executing programs to the third plurality of self-executing programs.

6. The method of any one of the preceding embodiments, wherein determining the third plurality of self-executing programs corresponding to the first blockchain action further comprises: determining a plurality of combinations of self-executing programs from the second plurality of self-executing programs required to be executed to perform the first blockchain action; and assigning each self-executing program of the self-executing programs in the plurality of combinations to the third plurality of self-executing programs.

7. The method of any one of the preceding embodiments, wherein determining the plurality of combinations of the self-executing programs of the second plurality of self-executing programs required to be executed to perform the first blockchain action further comprises: generating a feature input based on the plurality of combinations of the self-executing programs of the second plurality of self-executing programs; inputting the feature input into an artificial intelligence model to generate an output; and determining the first subset of the first plurality of self-executing programs based on the output.

8. The method of any one of the preceding embodiments, further comprising: receiving a second user request to apply a second self-executing program requirement; filtering the first subset based on the second self-executing program requirement to generate a second subset of self-executing programs for performing the first blockchain action; and generating a second recommendation, on the first user device, for performing the first blockchain action using the second subset.

9. The method of any one of the preceding embodiments, further comprising: retrieving a list of known entities; filtering the first subset based on the list of known entities to generate a second subset of self-executing programs for performing the first blockchain action; and generating a second recommendation, on the first user device, for performing the first blockchain action using the second subset.

10. The method of any one of the preceding embodiments, further comprising: retrieving known entity labels validated by a blockchain platform service; filtering the first subset based on the known entity labels to generate a second subset of self-executing programs for performing the first blockchain action; and generating a second recommendation, on the first user device, for performing the first blockchain action using the second subset.

11. The method of any one of the preceding embodiments, wherein determining the second plurality of self-executing programs corresponding to the first self-executing program requirement further comprises: determining an asset characteristic for the first blockchain action; and filtering the first plurality of self-executing programs based on whether each of the first plurality of self-executing programs supports the asset characteristic.

12. The method of any one of the preceding embodiments, wherein filtering the second plurality of self-executing programs based on the first self-executing program requirement to generate the first subset further comprises: determining a plurality of available networks for performing the first blockchain action; and filtering the plurality of available networks based on the first user request.

13. The method of any one of the preceding embodiments, wherein determining that the second plurality of self-executing programs corresponding to the first self-executing program requirement further comprises: querying each of the first plurality of self-executing programs for a self-executing program characteristic; and determining whether each of the first plurality of self-executing programs corresponds to the self-executing program characteristic.

14. The method of any one of the preceding embodiments, wherein filtering the third plurality of self-executing programs based on the second plurality of self-executing programs to generate a first subset of self-executing programs for performing the first blockchain action further comprises: generating a feature input based on the second plurality of self-executing programs; inputting the feature input into an artificial intelligence model to generate an output; and determining the first subset of the first plurality of self-executing programs based on the output.

15. The method of any one of the preceding embodiments, wherein generating the feature input based on the second plurality of self-executing programs further comprises: determining a plurality of self-executing program characteristics for the second plurality of self-executing programs; and generating an array of values representing the plurality of self-executing program characteristics.

16. The method of any one of the preceding embodiments, wherein filtering the third plurality of self-executing programs based on the second plurality of self-executing programs to generate the first subset further comprises: ranking the first plurality of self-executing programs based on the first self-executing program requirement to generate a plurality of rankings; and filtering the plurality of rankings based on a threshold ranking to determine the first subset.

17. The method of any one of the preceding embodiments, the method comprising: receiving a first user request to generate a mapping of a first network, wherein the mapping indicates self-executing program characteristics corresponding to each self-executing program of a first plurality of self-executing programs; in response to the first user request, querying the first plurality of self-executing programs to generate the mapping by: identifying each self-executing program in the first plurality of self-executing programs; determining respective relationships between each self-executing program in the first plurality of self-executing programs and other self-executing programs in the first plurality of self-executing programs; and determining respective self-executing program characteristics for each self-executing program in the first plurality of self-executing programs; and storing the mapping.

18. The method of any one of the preceding embodiments, the method comprising: receiving a second user request to perform a first blockchain action using the first network, wherein the second user request comprises a first self-executing program requirement; determining, based on the mapping, a second plurality of self-executing programs corresponding to the first self-executing program requirement and the first blockchain action; and generating a first recommendation for performing the first blockchain action using the second plurality of self-executing programs.

19. The method of any one of the preceding embodiments, the method comprising: receiving a third user request in response to the first recommendation; and executing the first blockchain action based on the first recommendation.

20. The method of any one of the preceding embodiments, the method comprising: determining that the first blockchain action has been executed; and generating for display, on a user interface, a confirmation that the first blockchain action has been executed based on the first recommendation.

21. A tangible, non-transitory, machine-readable medium storing instructions that, when executed by a data processing apparatus, cause the data processing apparatus to perform operations comprising those of any of embodiments 1-20.

22. A system comprising one or more processors; and memory storing instructions that, when executed by the processors, cause the processors to effectuate operations comprising those of any of embodiments 1-20.

23. A system comprising means for performing any of embodiments 1-20.

What is claimed is:

1. A system for generating network mappings of self-executing program characteristics and conducting blockchain actions based on the network mappings, the system comprising:
one or more processors; and
a non-transitory, computer readable medium comprising instructions that when executed by the one or more processors cause operations comprising:
generating a mapping of a first network, wherein the mapping indicates self-executing program characteristics corresponding to each self-executing program of a first plurality of self-executing programs, wherein generating the mapping comprises:
identifying each self-executing program in a first plurality of self-executing programs;
determining respective relationships between each self-executing program in the first plurality of self-executing programs and other self-executing programs in the first plurality of self-executing programs; and
determining respective self-executing program characteristics for each self-executing program in the first plurality of self-executing programs;
performing a first blockchain action using the first network according to a first self-executing program requirement;
determining, based on the mapping, a second plurality of self-executing programs corresponding to the first self-executing program requirement and the first blockchain action; and
performing the first blockchain action using the second plurality of self-executing programs.

2. A method for conducting blockchain actions based on network mappings of self-executing program characteristics, the method comprising:
receiving a mapping of a first network, wherein the mapping indicates self-executing program characteristics corresponding to each self-executing program of a first plurality of self-executing programs, and wherein the mapping is generated by:
determining respective relationships between each self-executing program in the first plurality of self-executing programs and other self-executing programs in the first plurality of self-executing programs; and
determining respective self-executing program characteristics for each self-executing program in the first plurality of self-executing programs; and
performing a first blockchain action using the first network by:
determining a first self-executing program requirement for the first blockchain action;
determining, based on the mapping, a second plurality of self-executing programs corresponding to the first self-executing program requirement;
determining a third plurality of self-executing programs corresponding to the first blockchain action;
filtering the third plurality of self-executing programs based on the second plurality of self-executing programs to generate a first subset of self-executing programs for performing the first blockchain action; and
performing the first blockchain action using the first subset.

3. The method of claim 2, wherein determining the second plurality of self-executing programs corresponding to the first self-executing program requirement further comprises:
receiving the mapping of the first network; and
comparing the first self-executing program requirement to the self-executing program characteristics corresponding to each self-executing program of the first plurality of self-executing programs.

4. The method of claim 2, wherein determining the third plurality of self-executing programs corresponding to the first blockchain action further comprises:
determining a series of self-executing programs required to be serially executed to perform the first blockchain action; and
assigning each self-executing program in the series of self-executing programs to the third plurality of self-executing programs.

5. The method of claim 2, wherein determining the third plurality of self-executing programs corresponding to the first blockchain action further comprises:
determining a plurality of combinations of self-executing programs from the second plurality of self-executing programs required to be executed to perform the first blockchain action; and
assigning each self-executing program of the self-executing programs in the plurality of combinations to the third plurality of self-executing programs.

6. The method of claim 5, wherein determining the plurality of combinations of the self-executing programs of the second plurality of self-executing programs required to be executed to perform the first blockchain action further comprises:
generating a feature input based on the plurality of combinations of the self-executing programs of the second plurality of self-executing programs;
inputting the feature input into an artificial intelligence model to generate an output; and
determining the first subset based on the output.

7. The method of claim 2, further comprising:
filtering the first subset based on a second self-executing program requirement to generate a second subset of self-executing programs for performing the first blockchain action; and
performing the first blockchain action using the second subset.

8. The method of claim 2, further comprising:
retrieving a list of known entities; and
filtering the first subset based on the list of known entities to generate a second subset of self-executing programs for performing the first blockchain action.

9. The method of claim 2, further comprising:
retrieving known entity labels validated by a blockchain platform service; and
filtering the first subset based on the known entity labels to generate a second subset of self-executing programs for performing the first blockchain action.

10. The method of claim 2, wherein determining the second plurality of self-executing programs corresponding to the first self-executing program requirement further comprises:
determining an asset characteristic for the first blockchain action; and
filtering the first plurality of self-executing programs based on whether each of the first plurality of self-executing programs supports the asset characteristic.

11. The method of claim 2, wherein filtering the second plurality of self-executing programs based on the first self-executing program requirement to generate the first subset further comprises:
   determining a plurality of available networks for performing the first blockchain action; and
   filtering the plurality of available networks based on the plurality of available networks.

12. The method of claim 2, wherein determining that the second plurality of self-executing programs corresponding to the first self-executing program requirement further comprises:
   querying each of the first plurality of self-executing programs for a self-executing program characteristic; and
   determining whether each of the first plurality of self-executing programs corresponds to the self-executing program characteristic.

13. The method of claim 2, wherein filtering the third plurality of self-executing programs based on the second plurality of self-executing programs to generate a first subset of self-executing programs for performing the first blockchain action further comprises:
   generating a feature input based on the second plurality of self-executing programs;
   inputting the feature input into an artificial intelligence model to generate an output; and
   determining the first subset of the first plurality of self-executing programs based on the output.

14. The method of claim 13, wherein generating the feature input based on the second plurality of self-executing programs further comprises:
   determining a plurality of self-executing program characteristics for the second plurality of self-executing programs; and
   generating an array of values representing the plurality of self-executing program characteristics.

15. The method of claim 2, wherein filtering the third plurality of self-executing programs based on the second plurality of self-executing programs to generate the first subset further comprises:
   ranking the first plurality of self-executing programs based on the first self-executing program requirement to generate a plurality of rankings; and
   filtering the plurality of rankings based on a threshold ranking to determine the first subset.

16. A non-transitory, computer readable medium comprising instructions that when executed by one or more processors cause operations comprising:
   querying a first plurality of self-executing programs to generate a mapping of a first network, wherein the mapping indicates self-executing program characteristics corresponding to each self-executing program of a first plurality of self-executing programs, and wherein the mapping is generated by:
      identifying each self-executing program in the first plurality of self-executing programs;
      determining respective relationships between each self-executing program in the first plurality of self-executing programs and other self-executing programs in the first plurality of self-executing programs;
      determining respective self-executing program characteristics for each self-executing program in the first plurality of self-executing programs;
      storing the mapping; and
      performing a first blockchain action using the first network, wherein the first blockchain action has a first self-executing program requirement;
   determining, based on the mapping, a second plurality of self-executing programs corresponding to the first self-executing program requirement and the first blockchain action; and
   performing the first blockchain action using the second plurality of self-executing programs.

17. The non-transitory, computer readable medium of claim 16, wherein the instructions further cause operations comprising:
   generating a feature input based on respective self-executing program characteristics for each self-executing program in the first plurality of self-executing programs;
   inputting the feature input into an artificial intelligence model to generate an output; and
   determining the respective relationships based on the output.

18. The non-transitory, computer readable medium of claim 16, wherein the instructions further cause operations comprising:
   generating a feature input based on respective self-executing program characteristics for each self-executing program in the first plurality of self-executing programs;
   inputting the feature input into an artificial intelligence model to generate an output; and
   determining network routes for performing blockchain actions based on the output.

19. The non-transitory, computer readable medium of claim 16, wherein the instructions further cause operations comprising:
   generating a feature input based on respective self-executing program characteristics for each self-executing program in the first plurality of self-executing programs;
   inputting the feature input into an artificial intelligence model to generate an output; and
   generating the mapping based on the output.

* * * * *